Oct. 20, 1931.  C. H. RYMAL  1,827,913

BACK WATER AND CHECK VALVE

Filed June 28, 1930

Inventor
Cecil H. Rymal
by J. Daniel Stuwe
Attorney

Patented Oct. 20, 1931

1,827,913

UNITED STATES PATENT OFFICE

CECIL H. RYMAL, OF CHICAGO, ILLINOIS, ASSIGNOR OF ONE-HALF TO GEORGE MILSK, OF CHICAGO, ILLINOIS

BACK-WATER AND CHECK VALVE

Application filed June 28, 1930. Serial No. 464,470.

This invention relates to a back-water and check valve.

One of the main objects of this invention is to provide an inexpensive, but efficient and enduring back-water and check valve which is especially adapted for use in sewer conduits, and the like. Another object is to provide such a valve construction wherein the larger portion or casing may be of an inexpensive material, as for instance cast iron, and the valve seat and valve element proper may be set or mounted in the casing and may be of a nonrustable material, such as brass or rust-resisting steel.

These and other objects are attained with this invention, as disclosed in the description and in the accompanying drawings wherein.

Figure 1:
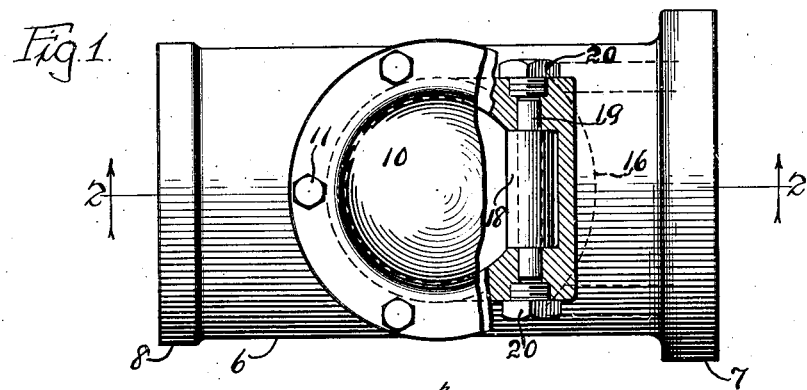
Fig. 1 is a plan view of the preferred form of construction, parts being broken away.

This valve invention is especially suitable for use in sewer conduits, but is also well adapted for use in other conduits and pipes, such as water pipes and the like.

In the drawings my invention is illustrated in its preferred form of construction comprising a valve casing 6 including a tubular body or conduit portion which may be cylindrical or of any suitable shape in cross-section, and which preferably is provided with bell means 7 at its inlet end and with nipple means 8 at its outlet end, to facilitate mounting or interposing it in conduits of the usual shape.

A tubular branch or neck 9 is provided on the tubular conduit portion, to extend from the cylindrical part thereof and substantially at right angles thereto, and is preferably formed integral therewith. A cover or closure 10 is removably mounted on said neck, as with bolts 11, thus providing an inspection port and access to the essential valve elements.

Whenever the conduit is a large one wherein this improved valve is intended to be used, as a sewer conduit, and such conduit is made of an inexpensive metal, like cast iron, and where rust producing ingredients are present in the fluid flowing through the valve, then the casing of this construction is also made of such inexpensive metal, as cast iron, and the valve means proper is then built up of a nonrustable metal, as brass or a rust-resisting steel, like nickel steel or chrome steel, and is securely mounted in the casing, so that the essential parts of the valve, that is the parts which are chiefly effected by the wear and by the rust-producing ingredients in the fluid, will be constructed of a nonrustable material and will endure a very long time, while at the same time only a small part of the valve is of expensive material and the cost of the entire construction is thus kept at a minimum, although all the long-enduring wearing qualities are incorporated in this form of valve.

In the present form of my invention these rust-resisting valve elements preferably include a sleeve 12 of brass, or nonrustable steel, like nickel steel or chrome steel; and this sleeve is preferably forced into the intake end of the conduit, as by means of hydraulic pressure, thus being seated and held therein with a driving fit, and being likewise adapted to be again driven out therefrom and replaced. The outer end of the sleeve is preferably thinned down to a substantially thin edge 13; while a valve seat 14 is provided on the inner end of the sleeve, located beneath neck 9, and is formed globular or spherical on its seating surface.

Figure 2:
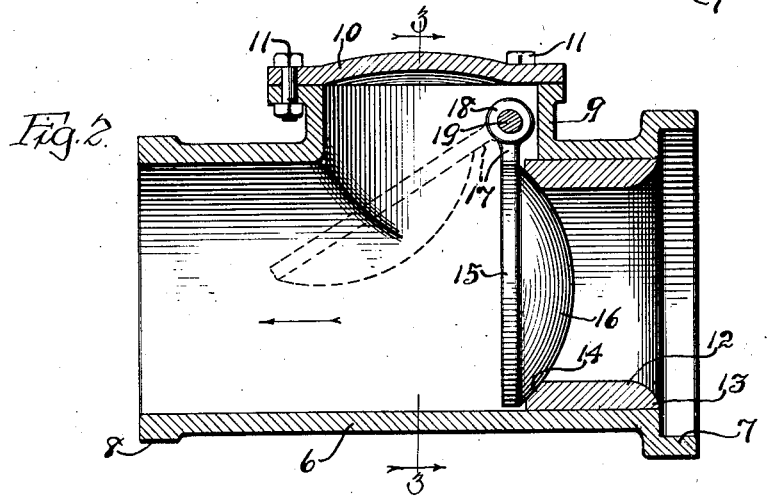
Fig. 2 is a vertical longitudinal sectional view, taken on line 2—2 of Fig. 1.
Figure 3:
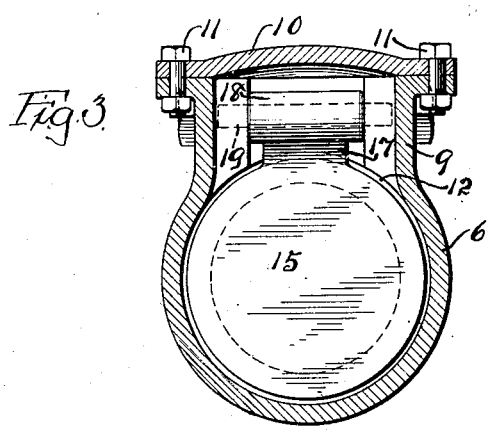
Fig. 3 is a vertical cross-sectional view, taken on line 3—3 of Fig. 2.

The valve element 15 is provided with a globular or spherical portion 16 to fit snugly in the valve seat 14, and said element has an integral arm 17 which is provided with a bearing sleeve 18 at its upper end extending up into neck 9. A pivot pin 19 extends through said sleeve and through a hole provided in the neck, for swingably mounting the valve element, so that it will fit snugly in the seat 14, as shown in full lines in Fig. 2, whenever any backflow closes it; and the valve may be moved to the upper position or open position, as indicated in dotted lines in Fig. 2, when a large amount of fluid flows through said conduit in the direction of the arrow. Cups 20 are preferably threaded or placed in each side of the neck, at each end of the pin, to enable removing the pin from either side of the casing, when it is desired to remove the valve element.

This construction provides a very efficient valve and one that will endure for a long time, and at the same time provides a very economical valve.

I claim as my invention:

1. A back-water and check valve comprising a cast iron casing including a main body portion having a tubular end part which has its interior surface smooth and straight from end to end of said part, a tubular branch extending from said casing, a tubular sleeve of non-rustable metal which has its exterior smooth and straight and which extends from the outer end of said part to project inwardly of said branch, being held with a driving fit tightly in said end part, to enable a tool to engage it through said branch to drive it out therefrom and to be replaced therein without injury to the casing or the sleeve, a valve element having a smooth face to fit in said valve seat, an arm on said valve element provided with pivot means on its end, and a pivot pin mounted in said branch and extending through said pivot means to be readily removable for removal of said valve elements.

2. A back-water and check valve comprising a cast iron casing including a main body portion having a tubular end part which has its interior surface smooth and straight from end to end of said part, a tubular branch extending from said casing, a tubular sleeve of non-rustable metal which has its exterior smooth and straight and extends from the outer end of said part to project inwardly of said branch, being held with a driving fit tightly in said end part, for enabling a tool to engage it through said branch to drive it out therefrom and to be replaced therein without injury to the casing or the sleeve, a valve element having a ball-shaped portion with an entirely smooth face to fit in said valve seat, an integral arm on said valve element provided with a sleeve on its outer end, a pivot pin extending through said tubular branch and through said sleeve, and means in the branch, at the two ends of the pin, to facilitate prompt removal of the pin from either end thereof.

In testimony whereof I have signed my name to this specification.

CECIL H. RYMAL.